United States Patent [19]

Scheibler et al.

[11] 3,868,443
[45] Feb. 25, 1975

[54] PROCESS FOR THE MANUFACTURE OF NITRIC ACID

[75] Inventors: Erich Scheibler; Hans-Joachim Volker, both of Dortmund, Germany

[73] Assignee: Friedrich Uhde GmbH, Dortmund, Germany

[22] Filed: Sept. 25, 1972

[21] Appl. No.: 292,000

[30] Foreign Application Priority Data
Sept. 28, 1971 Germany................ 2148329

[52] U.S. Cl.................... 423/392, 423/393
[51] Int. Cl............................ C01b 21/40
[58] Field of Search............. 423/392, 393, 394

[56] References Cited
UNITED STATES PATENTS
2,098,953  11/1937  Christensen ............. 423/392
3,389,960  6/1968  Miller .................... 423/392
3,542,510  11/1970  Newman et al. ........... 423/393 X
3,634,031  1/1972  Hellmer ................... 423/393 X
3,676,065  7/1972  Oberste-Berghaus ........ 423/393
3,716,625  2/1973  Oberste-Berghaus ........ 423/392

FOREIGN PATENTS OR APPLICATIONS
246,889  2/1926  Great Britain

Primary Examiner—G. O. Peters
Attorney, Agent, or Firm—Malcolm W. Fraser, Esq.

[57] ABSTRACT

A process for the simultaneous production of nitric acid of medium and high concentration from a stream of gas containing nitrogen oxides, preferably as nitrogen monoxides.

1 Claim, 1 Drawing Figure

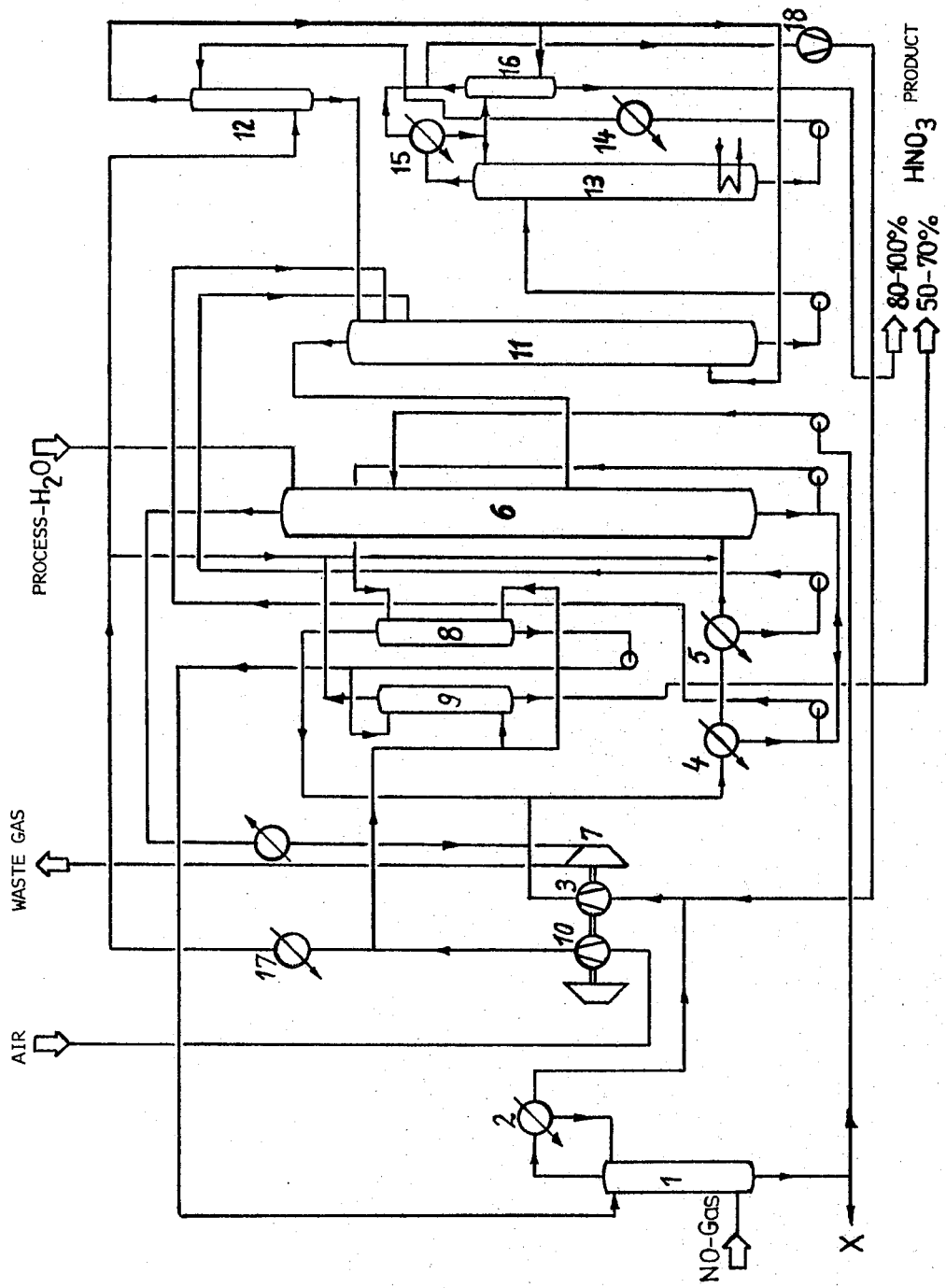

PROCESS FOR THE MANUFACTURE OF NITRIC ACID

BACKGROUND OF THE INVENTION

In processes for the manufacture of nitric acid it is essential that the starting material, in this case nitrogen oxides, which are generally derived from the combustion of ammonia, be converted to as high a degree as possible into the end product, that a high final concentration of the end product or products is achieved, and that waste gases having only a minimal content of harmful components are released into the atmosphere.

By nitric acid of medium concentration is meant nitric acid having a concentration of about 50 to 70 % by weight, and by nitric acid of high concentration is meant nitric acid having a concentration of about 80 to 100 %. The term "gaseous nitrogen oxides" as used herein refers to nitrogen monoxide and nitrogen dioxide.

Nitric acid is an industrial intermediate product; that is to say, it is used as a component in other processes. Only nitric acid having a concentration close to 100 % by weight can sometimes be an end product. The water content in nitric acid of a concentration below 100 % by weight is desirable in some cases for the preparation of fertilizers, since otherwise water has to be added. However, a part of the water constitutes ballast, and the greater the distance the nitric acid has to be transported, the greater is the negative effect of this ballast. In many chemical processes, the water content is actually a source of trouble.

Thus, the general aim is to produce nitric acid in as high a concentration as possible, which means that, in the case of nitric acid having the above-mentioned ranges of concentration, the final values are aimed at.

In the past, manufacturing processes have developed in two different directions, one being aimed at the manufacture of nitric acid of medium concentration, and the other at the manufacture of nitric acid of high concentration. The repeated distillation of nitric acid of medium concentration to obtain nitric acid of high concentration is not being regarded as an independent direction of approach.

A number of manufacturing processes have been developed since the demand for nitric acid of medium and high concentration has increased and the capacities of nitric acid plants have been extended such that the simultaneous manufacture of medium and high concentration nitric acid has become feasible. However, a feature that these processes have in common is that they require for their operation a combination of plant units for the manufacture of mediumconcentration nitric acid and plant units for the manufacture of high concentration nitric acid. Thus, for example, first nitric acid of medium concentration is manufactured by known process steps, and then a porportion of this acid is further processed into nitric acid of higher concentration. For example, it is stated in German Offenlegungsschrift No. 1,916,814 that the process of the invention to a certain extent is a combination of the conventional weak acid technique (combustion of ammonia to chemical absorption) and the known Hoko process, starting with $NO_2$ absorption. Further processing in the case of the known processes is characterized by the fact that, as aids to achieving the requisite nitrogen yield, the presence of nitrogen oxides in the waste gases must be avoided as much as possible, and the production of weak acid of low concentration is undesirable for known reasons, and also that refrigerating capacity, compression energy, industrially pure oxygen, distillation energy, dehydrating agents and/or highly concentrated nitric acid are required in the circuit.

The said aids require machines, apparatus, piping, accessories and measuring instruments, with a corresponding increase in sources of trouble.

The use of highly concentrated nitric acid in the cycle as absorbing agent is an additional source of danger because of the large amount circulated, and it means that a sufficient amount of highly concentrated nitric acid must already be present when starting up a plant of this kind.

SUMMARY OF THE INVENTION

The purpose of this invention is to provide means for converting the nitrogen oxides simultaneously in a simple manner into nitric acid of different concentrations, to balance the water economy and to produce waste gases having a low NO content.

This is achieved in accordance with the invention in that nitrogen monoxides, that preferably come from the combustion of ammonia with a minimal excess of oxygen in the presence of catalysts, are oxidized to a higher state of oxidation with nitric acid of medium concentration, the gas mixture is cooled, compressed, mixed with gas from the first degassing tower for nitric acid of medium concentration, cooled in two steps. The stream of gas from the second cooling step is reacted with compressed air in an absorption column to form nitric acid of medium concentration, whereby additionally the waste gases from the absorption column for high-concentration nitric acid are conducted to the absorption column for medium-concentration nitric acid. The nitric acid of medium concentration is degassed once and part of it is used to oxidize the nitrogen monoxides. The weak, aqueous nitric acid from the oxidation process is conducted to the absorption column for nitric acid of medium concentration. The condensate from the two cooling steps is reacted with an oxygen bearing gas in an absorption column to form high concentration nitric acid. The high concentration nitric acid is conducted to a distillation apparatus for the purpose of increasing the concentration, and the base product is degassed and conducted to the absorption column for nitric acid of high concentration.

The condensate from the first cooling step contains mainly $HNO_3$, and the condensate from the second cooling step contains mainly $N_2O_4$. It is expedient to conduct the nitrogen monoxide bearing gas at a temperature of from about 100° to 200°C to the oxidation process when the oxidation of the nitrogen monoxides is carried out at a pressure of about 1 atmosphere (absolute) and when the stream of gas, subsequent to oxidation and cooling, is compressed to about 4 to 10 atmospheres (absolute). In order not to dilute the gas mixture subsequent to compression, the gas from the first degassing tower for nitric acid of medium concentration should have approximately the same $NO_2$ content as the gas mixture from the oxidation process. According to a further embodiment of the invention, the ideal ratio of produced nitric acid of high concentration to produced nitric acid of medium concentration can be shifted by the admission of additional process water or by distillation of water from the nitric acid of low concentration from the oxidation process.

The advantages offered by the process of the invention are, in particular, that nitrogen oxides can be converted in a simple manner partly into nitric acid of medium concentration and partly into nitric acid of high concentration, and that the additional aids required for the simultaneous production of nitric acid of high concentration, for example, refrigeration, compression to pressures much higher than 10 atmospheres (absolute), pure oxygen, highly concentrated nitric acid and dehydrating agents, can be dispensed with. This also means that the additional plant required for these aids with all its additional sources of trouble and danger is not needed. Because of the balance between nitric acid of medium concentration and nitric acid of high concentration, weak acid is not obtained as a product. There is no reduction in the nitrogen yield of the total process as a result of the simple plant requred for the manufacture of nitric acid of high concentration.

The process is very flexible with regard to the ratio of nitric acid of high concentration to nitric acid of medium concentration, which means that the operator of the process can adapt production quickly to the requirements of the market.

If the ratio of nitric acid of medium concentration to nitric acid of high concentration has to deviate from the ideal ratio, taking into account the water entrained with the combustion air and the process water for purifying the waste gases, and more nitric acid of higher concentration produced, the requisite amount of water can be removed at the outlet of the oxidation unit by means of simple distillation plant. The plant also enables nitrogen tetroxide $N_2O_4$ to be conducted away directly. This necessarily reduces the amount of nitric acid of high concentration produced.

BRIEF DESCRIPTION OF THE DRAWING

The FIGURE is a diagram showing the course of the process for producing nitric acid of different concentrations.

DESCRIPTION OF THE PREFERRED EMBODIMENT

The following example illustrates the invention.

97 kg/h of $NH_3$ and 935 m³/h of atmospheric air in the form of a mixture were conducted to a catalytic oxidation process. After the gases had been cooled to 140°C in a waste-heat boiler, they were brought into contact with 610 kg/h of nitric acid having a concentration of 65 % by weight $HNO_3$ in a desorber. 569 kg/h of nitric acid of 30.2 % by weight $HNO_3$ were drawn off. Whereas the nitrogen oxide content was 0.163 g/l before the desorber, it amounted to 0.257 g/l, as NO, referred to the dry gas, after the desorber. After the gas had been compressed in a NO compressor to 10 atmosheres (absolute) and subsequently cooled to 20°C in a gas cooler and in a $N_2O_4$ condenser, 39,7 kg/h of condensate, mainly $N_2O_4$, could be obtained from the $N_2O_4$ condenser.

The NO gases from the $N_2O_4$ condenser and the nitric acid leaving the desorber were conducted to an absorption plant and processed into nitric acid having a concentration of about 65 % by weight $HNO_3$.

The condensate from the $N_2O_4$ condenser together with 55 l/h of condensate from the gas cooler were introduced into a rectification column; 2.7 m³/h of dry air having a temperature of 50°C were conducted countercurrent thereto. 116 kg/h of nitric acid having a concentration of 84,7 % by weight $HNO_3$ could be drawn off at the base of the column.

Weak nitric acid from the absorber 1 is conducted to the absorption system 6 for medium concentration as absorbing agent. The gases leaving the absorption system, designated waste gases, are washed with process water prior to entering the atmosphere and thus contain only a very small proportion of nitrogen oxides. For the purpose of recovering energy, it is appropriately heated, for example, by streams from other processes, and released into the atmosphere by way of a waste gas expansion turbine 7. The acid having a concentration of 50 to 70 % by weight $HNO_3$ leaving the absorption system 6 is degassed by means of air in a degassing tower 8. Downstream of the degassing tower 8, the acid of medium concentration is divided into two streams. The stream of 50 to 70 % by weight nitric acid, according to requirements, is degassed in another degassing tower 9 and leaves the process. The stream directed away from the desired amount of 50 to 70 % by weight $HNO_3$ is diverted to a desorption process after the degassing tower 8. Compressed secondary air having a temperature of from 70° to 150°C which is drawn from the atmosphere by the air compressor 10 is used as blow out air for degassing towers 8 and 9. Air is blown into the degassing tower 8 in an amount such that the gas appearing at the head has at least the same nitrogen oxide gas concentration as the process gas stream ahead of gas cooler 4. The amount of blow out gas for the degassing tower 9 depends on the degree of degassing required for the 50 to 70 % by weight $HNO_3$. The streams of gas leaving the heads of the degassing towers 8 and 9, which contain the blown out nitrogen oxides in different concentrations, are introduced separately into the process gas stream. The stream of gas from degassing tower 8 having a higher concentration of nitrogen oxides is introduced into the process gas stream before the gas cooler 4, and the stream of gas from degassing tower 9 having a lower concentration of nitrogen oxide gas is introduced into the process gas stream after the $N_2O_4$ condenser. The oxygen required for the formation of $HNO_3$ in the absorption system 6 is introduced into the process gas stream in the form of cooler air before the gas stream enters the absorption system 6.

This acid contained only small amounts of dissolved nitrogen oxides. The residual gases from this rectification column were likewise conducted to the absorption column.

The course of the process of the invention is illustrated diagrammatically by way of example in FIG. 1. The description refers to a process for the manufacture of the following products:

20 % of the amount of nitrogen used as 98 % by weight $HNO_3$ and 80 % of the amount of nitrogen used as 65 % by weight $HNO_3$.

A stream of gas coming from the combustion of $HN_3$ and containing nitrogen oxides, preferably as nitrogen monoxides, enters the lower part of a desorber 1 at a pressure of 0.95 atmosphere (absolute) and at a temperature of about 140°C. Aqueous nitric acid having a concentration of 65 % by weight and a temperature of about 60°C is introduced into the upper section of the desorber. The nitrogen monoxides present in the stream of gas is oxidation to a higher state of oxidation by desorption of the aqueous nitric acid. In this operation, the stream of gas can be enriched in nitrogen dioxide by 3 times the initial concentration by volume of nitrogen monoxide. The stream of gas thus enriched and almost fully oxidized to a higher state of oxidation is cooled in a gas cooler 2 and subsequently compressed to a pressure of 10 atmospheres (absolute) in a nitrous gas compressor 3. The $HNO_3$ condensate obtained in the gas cooler 2 is introduced into the head of the desorber 1. In the subsequent gas cooler 4, a relatively highly concentrated nitric acid having a low di-nitrogen tetroxide content is condensed out, whereas in the subsequent $N_2O_4$ condenser 5 almost pure dinitrogen tetroxide having a low proportion of nitric acid is obtained. The stream of gas having a residual content of nitrogen oxides is conducted to an absorption system 6 for acid of medium concentration and used for the manufacture of nitric acid of 50 to 70 % by weight.

The condensation of liquid dinitrogen tetroxide in the $N_2O_4$ condenser 5 is controlled quantitatively such that it corresponds to the desired amount of nitric acid of high concentration.

The condensed $N_2O_4$ for the manufacture of nitric acid of high concentration is conducted to the rectification column 11 where it is reacted with an input acid of about 70 % by weight $HNO_3$ and the oxygen of dried air flowing in the opposite direction, whereby 75 to 95 % by weight $HNO_3$ is formed. The input acid used is the $HNO_3$ condensate from gas cooler 4. Nitric acid from the air drying tower 17 is also added. The nitrogen oxide bearing gas escaping from the head of the rectification column is conducted to the absorption system 6. Enriched acid having a concentration of about 85 % by weight $HNO_3$ is obtained from the base of the rectification column 11.

In order to concentrate the enriched acid further, it is conducted to a heated distillation column 13, which is operated at subatmospheric pressure, and separated therein into a bottom product of about azeotropic concentration and an overhead product having a concentration of about 99 % by weight $HNO_3$. The product obtained at the base is cooled in cooler 14 and used in the air drying tower 12 to dry the air for the rectification column. The overhead product is in vaporous form and is liquified in the condenser 15. Part of the condensate obtained is returned to the column 13. The remaining condensate, which is the actual amount of nitric acid of high concentration obtained as the end product, is blown out in the degassing tower 16 with dried air from the air drying tower 12 prior to leaving the process. The air conducted to the air drying tower for drying comes as cool, moist air from the air compressor 10 by way of the air cooler 17. Sub-atmospheric pressure is maintained in condenser 15 and in degassing tower 16 by means of a vacuum pump 18. The gases and vapours withdrawn from items 15 and 16 are recycled to the process on the suction side of the nitrous gas compressor 3.

The example of the process described herein applies to the amounts indicated of nitric acid of medium concentration and high concentration. This special division corresponds to a calculated total mixture concentration of about 70 % by weight $HNO_3$.

If a total mixture concentration greater than 70 % is required, part of the acid stream from the desorber 1 must be conducted to a distillation unit at X which is not shown. The product obtained at the base of the distillation column, an acid of about 60 % strength, is returned to the desorber 1, whereas the product obtained at the head of the column, which is practically pure water, is removed from the process.

What we claim is:

1. A process for the simultaneous manufacture of nitric acid of medium (50 to 70% by weight) and high concentration (80 to 100% by weight) from a nitrogen monoxide containing gas stream issuing from the combustion of a gas mixture of ammonia and air with a content of 12 to 13% of ammonia in the presence of catalysts, the process comprising
    a. oxidizing the nitrogen monoxide in the gas stream to a higher state of oxidation by countercurrent flow of nitric acid of a concentration of 50 to 70% by weight.
    b. cooling the gas stream to a temperature of approximately 60°C.,
    c. compressing the gas stream to approximately 10 atm,
    d. mixing the gas stream with the first degassing effluent of nitric acid of 50 to 70% by weight concentration,
    e. cooling this mixed gas stream in a first step to approximately 30°C. and in a second step to about 20°C. and separating the condensate from residual gases;
    f. reacting the residual gases from the second cooling step with compressed air, water, nitrogen oxide bearing gas of the following absorption step for nitric acid of high concentration and the drained aqueous nitric acid from the oxidation step of nitrogen monoxide in an absorption step to form nitric acid of a concentration of 50 to 70% by weight,
    g. degassing the nitric acid of medium concentration once and using part of it to oxidize the nitrogen monoxide,
    h. reacting the condensate from the two cooling steps of (e) with the bottom product of about azeotropic concentration of the distillation step (i) for nitric acid of high concentration up to 90% by weight, and
    i. distilling the effluent from the absorption step (h) in nitric acid of high concentration (more than 90% by weight) and in a bottom product of about azeotropic concentration.

* * * * *